United States Patent
Lampe et al.

(10) Patent No.: US 6,970,421 B1
(45) Date of Patent: Nov. 29, 2005

(54) STATISTIC MULTIPLEXING OF ATM-CONNECTIONS

(75) Inventors: Dorothea Lampe, Neuried (DE); Eugen Wallmeier, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,461

(22) PCT Filed: Nov. 7, 1997

(86) PCT No.: PCT/DE97/02601

§ 371 (c)(1),
(2), (4) Date: May 18, 1999

(87) PCT Pub. No.: WO98/24260

PCT Pub. Date: Jun. 4, 1998

(30) Foreign Application Priority Data

Nov. 29, 1996 (DE) .................... 196 49 649

(51) Int. Cl.⁷ .................... H04L 12/28; H04L 12/56
(52) U.S. Cl. ............ 370/230; 370/395.21; 370/395.43
(58) Field of Search .................... 370/253, 229, 370/230–235, 395.41, 395.42, 395.43, 395.61, 370/395.21

(56) References Cited

U.S. PATENT DOCUMENTS

| | | | |
|---|---|---|---|
| 5,132,966 A | * | 7/1992 | Hayano et al. ............ 370/233 |
| 5,216,669 A | | 6/1993 | Hofstetter et al. |
| 5,436,894 A | | 7/1995 | Wallmeier et al. |
| 5,463,620 A | * | 10/1995 | Sriram ...................... 370/229 |
| 5,581,544 A | * | 12/1996 | Hamada et al. ............ 370/230 |
| 5,831,972 A | * | 11/1998 | Chen .......................... 370/230 |
| 5,982,748 A | * | 11/1999 | Yin et al. .................... 370/232 |
| 6,028,840 A | * | 2/2000 | Worster ...................... 370/230 |
| 6,314,102 B1 | * | 11/2001 | Czerwiec et al. ......... 370/395.6 |

FOREIGN PATENT DOCUMENTS

| | | |
|---|---|---|
| EP | 0 448 073 A2 | 9/1991 |
| EP | 0 596 624 A2 | 11/1994 |
| EP | 0 629 065 A2 | 12/1994 |
| EP | 0 673 138 A2 | 9/1995 |

OTHER PUBLICATIONS

International Journal of Digital and Analog Communication Systems, vol. 3, (1990), Eugen Wallmeier, "A Connection Acceptance Algorithm for ATM Networks Based on Mean and Peak Bit Rates", pp. 143-153.

* cited by examiner

Primary Examiner—Ricky Ngo
Assistant Examiner—Soon D. Hyun
(74) Attorney, Agent, or Firm—Morrison & Foerster LLP

(57) ABSTRACT

A plurality of ATM links are transmitted via a connecting section. If a further transmitting device wishes to make a call, it is first of all necessary to check whether this new ATM link can still be multiplexed onto the connecting section. The known sigma rule algorithm is used for this purpose in the prior art. In order to achieve better utilization of the transmission capacity, the class used in this prior art is now subdivided into a plurality of sub-classes. The best class for the transmission is thus then selected.

3 Claims, 2 Drawing Sheets

| Class $S_1$ | Class $S_2$ | Class $S_3$ |
|---|---|---|
| 64 kbit/s≤PBR<2.048 Mbit/s | 1 Mbit/s≤PBR<2.048 Mbit/s | 64 kbit/s≤PBR<4.096 Mbit/s |
| 0.1≤SCR/PCR≤0.5 | 0.1≤SCR/PCR≤0.5 | 0.1≤SCR/PCR≤0.5 |
| q(c)=8.0+40 Mbit/s/ c[Mbit/s] | q(c)=6.9+75 Mbit/s/ c[Mbit/s] | q(c)=8.5+50Mbit/s/ c[Mbit/s] |

FIG 1

| Class $S_1$ | Class $S_2$ | Class $S_3$ |
|---|---|---|
| 64 kbit/s≤PBR<2.048 Mbit/s | 1 Mbit/s≤PBR<2.048 Mbit/s | 64kbit/s≤PBR<4.096 Mbit/s |
| 0.1≤SCR/PCR≤0.5 | 0.1≤SCR/PCR≤0.5 | 0.1≤SCR/PCR≤0.5 |
| q(c)=8.0+40 Mbit/s/ c[Mbit/s] | q(c)=6.9+75 Mbit/s/ c[Mbit/s] | q(c)=8.5+50Mbit/s/ c[Mbit/s] |

FIG 2

| Interface Type | Upper and lower boundaries of Class S (expressed as bit rates) | q(c) values q(c)=Q1+q2/c (q2 and expressed as bit rates) |
|---|---|---|
| 1 | 64kbit/s ≤ PBR <1.024 Mbit/s | 7.4+30Mbit/s/ c[Mbit/s] |
|  | 64kbit/s ≤ PBR <0.512 Mbit/s | 6.9+23Mbit/s/ c[Mbit/s] |
| 2 | 64kbit/s ≤ PBR <1.024 Mbit/s | 7.4+30Mbit/s/ c[Mbit/s] |
|  | 64kbit/s ≤ PBR <0.512 Mbit/s | 6.9+23Mbit/s/ c[Mbit/s] |
| 3 | 64kbit/s ≤ PBR <1.024 Mbit/s | 7.4+30Mbit/s/ c[Mbit/s] |
|  | 1,024kbit/s ≤ PBR <2.048 Mbit/s | 6.9+75Mbit/s/ c[Mbit/s] |
|  | 64kbit/s ≤ PBR <2.048 Mbit/s | 8.0+40Mbit/s/ c[Mbit/s] |
|  | 64kbit/s ≤ PBR <4.096 Mbit/s | 8.5+50Mbit/s/ c[Mbit/s] |

STATISTIC MULTIPLEXING OF ATM-CONNECTIONS

BACKGROUND OF THE INVENTION

The present invention relates to a method for statistical multiplexing of ATM Links.

Two types of connection are generally defined for connections via which information is transmitted using an asynchronous transfer mode (ATM). A distinction is thus drawn between, connections by means of which information is transmitted at a constant bit rate (CBR) and connections via which information is transmitted at a variable bit rate (VBR). In this case, the information is transmitted in ATM cells. Particularly in the case of variable bit rate transmissions, the ATM cells are transmitted in an irregular time sequence, as a result of which so-called "bursts" occur. This means that the cells are transmitted at an increased level in a short time interval, while no cells are transmitted in the remaining time. A range of transmission parameters have been defined to describe these connections. These include, for example, the peak cell rate (PCR). This is an upper limit for the number of cells which can be transmitted by a transmitting device per second.

In general, when setting up an ATM link, the transmitting device must report previously defined parameters to a higher-level control device (call acceptance control). This is necessary to ensure the quality of the connection for all subscribers (quality of service). If, for example, too many cells are transmitted, and the transmission capacity is thus exceeded, too many cells would have to be rejected. However, this must always be avoided since this is inevitably linked with a loss of information. Standardization committees, for example, have produced a requirement for a cell loss probability of $10^{-10}$ for a link, in this case. For this reason, even while the connection is being set up, a calculation is carried out to determine whether this new connection can be added to already existing connections. If the transmission capacity is already exhausted, the requesting connection is rejected.

These processes are handled in the higher-level control device by an algorithm which checks the parameters received from the transmitting device. Furthermore, these parameters are compared with already calculated parameters relating to the current load on the connecting line. These comparisons are then used as the basis to decide whether the new call request can be accepted, and this call can also be approved. The already-mentioned peak cell rate (PCR) is used as a parameter. In addition, for a connection with variable bit rate, the transmitting device reports a sustainable cell rate (SCR) to the control device. This is the upper limit for a mean cell rate at which the cells are transmitted while the connection exists. As further parameters, the control device recognizes the maximum possible transmission capacity of the connecting line (link cell rate, C) and the maximum possible load on the connecting line ($P_o$). The former is effectively an equipment constant for the connecting line, while the latter defines a variable which is used to indicate the maximum permissible total cell rate on the connecting line. As a rule, this is 95% of the maximum possible transmission capacity of the connecting line. This parameter is then used to decide whether new call requests can or cannot be accepted.

In the prior art, a number of methods have been developed for handling these processes. The peak cell rate reservation algorithm should be mentioned here, as a simple method. In this case, an n-th connection is approved only if the following expression is satisfied for the (n−1) already existing connections plus the n-th connection:

$$\sum_{i=1}^{n} PCR_i \leq p_0 \cdot C \qquad (a)$$

If this condition is not satisfied, the call request is refused.

The sigma rule algorithm should also be mentioned as another known method. This method is described in the document "E. Wallmayer, 'Connection acceptance algorithm for ATM-Networks based on mean and peak bit rates', International Journal of Digital and Analog Communication Systems, Vol. 3, pp. 143 to 153, 1990". In this case, this known method is a further development of the peak cell rate reservation algorithm. In addition to the condition (a), another condition (b) must also be satisfied here:

$$\sum_{VC_i \, \varepsilon \, \text{Class } S} SCR_i + q(c, \text{Class } S) \cdot \left( \sum_{VC_i \, \varepsilon \, \text{Class } S} SCR_i \cdot (PCR_i - SCR_i) \right)^{1/2} \leq P_0 \cdot C - \sum_{VC_i \, \varepsilon \, \text{Class } P} PCR_i \qquad (b)$$

where $c = p_o \cdot C - \Sigma \, PCR_i$, the free capacity for Class S.

It can be seen from condition (b) that the existing connections are split into 2 classes here. At the start of the process of setting up a connection, the sigma rule algorithm therefore has to decide which of two classes, namely a Class S or a Class P, the possibly newly incoming ATM link must be allocated to.

Class S is used for all virtual connections for which statistical multiplexing in accordance with the sigma rule algorithm would result in a clear improvement over the peak cell rate reservation algorithm. As a rule, these are low bit-rate connections. As a criterion for connections of this type, the peak cell rate and the sustainable cell rate of all the connections to be multiplexed statistically must satisfy the following condition:

$PCR/C < 0.03$ and $(0.1 \leq SCR/PCR \leq 0.5)$

Class P is used for all the other virtual connections. These include, in particular, those connections at a constant bit rate. This also includes all the connections for which the parameters SCR and PCR are very close to one another—or are very far apart from one another, or which already have a high peak cell rate PCR. One criterion for this is a peak cell rate that is greater than 3% of the maximum possible transmission capacity of the connecting line.

Furthermore, condition (b) includes a factor q. This factor is dependent not only on the Class S but also the free capacity c of Class S. For a defined Class S, the q(c) values must be calculated using a complex program. For simplicity with regard to dynamic aspects, the dependency on the variable c is estimated by a hyperbolic function $q(c) = q_1 + q_2/c$.

Thus, in this prior art, an n-th virtual connection $VC_n$ with a defined peak cell rate $PCR_n$ and a sustainable cell rate $SCR_n$ is approved for (n−1) already existing virtual connections $VC_i$ with the parameters $SCR_i$ as well as $PCR_i$ ($1 \leq i \leq n-1$) on a connecting line, provided the conditions (a) or (b) are satisfied.

Using condition (a), a check is carried out to determine whether the sum of the peak cell rates of all n connections on the connecting line is less than or equal to the maximum possible transmission capacity on the connecting line. If this is the case, then the n-th virtual connection can be accepted, and the question in condition (b) is superfluous. If this is not the case, then condition (b) is used to check whether the upper estimate of the mean value of the sum of the peak cell rates of all the connections in Class S, together with a cell rate which is calculated from the burst probability of all the connections in Class S, is less than or equal to the cell rate which is currently available for Class S connections. If this is the case, then the n-th virtual connection is accepted, and if not it is rejected.

A disadvantage with this prior art is that, when the sigma rule algorithm is used, the maximum transmission capacity on the transmission line is not completely exhausted.

European Patent Application EP 0 673 138 A2 discloses a method for approval of ATM links. According to this document, the connections to be accepted are subdivided into traffic classes, and a calculation is carried out to determine whether the new connection can be accepted, in terms of its bandwidth. Thus, however, in this case as well, the maximum transmission capacity on the transmission line is not completely exhausted.

European Patent Application EP 0 596 624 A2 likewise discloses a method for approval of ATM links. Once again, the connections to be accepted are subdivided into traffic classes. In this case as well, this document does not address fine control for the purpose of completely exhausting the maximum transmission capacity on the transmission line.

SUMMARY OF THE INVENTION

It is an object of the present invention to provide a more efficient method for transmitting ATM cells on a connecting line.

In general terms the present invention is a method for statistical multiplexing of ATM links. A plurality of virtual connections, which transmit ATM cells via a connecting line, and further incoming connections are assigned to a first or a second class depending on question criteria. The first and the second classes are subdivided into further sub-classes. the question criteria are applied successively in steps to each of the sub-classes until a further incoming connection accepted in a sub-class, or all the sub-classes have been passed through.

Advantageous developments of the present invention are as follows.

The question criteria are formed by linking transmission parameters of the connecting line and/or of the connection.

The transmission parameters and/or their links to one another are stored in a network node, and are updated when an ATM link is set up and/or clear.

It is particularly advantageous for the invention for Class S, which is used in the prior art, to be subdivided into a plurality of sub-classes. The sigma rule algorithm can then be used efficiently to select the best class for the transmission. In practice, this means even more refined assignment of connections to the defined classes, as a result of which the efficient transmission of ATM cells on the connecting line is further improved.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows the method according to the invention in tabular form, for only one transmission rate;

FIG. 2 shows the method according to the invention in tabular form, for a plurality of transmission rates.

DESCRIPTION OF THE PREFERRED EMBODIMENTS

Figure 3:
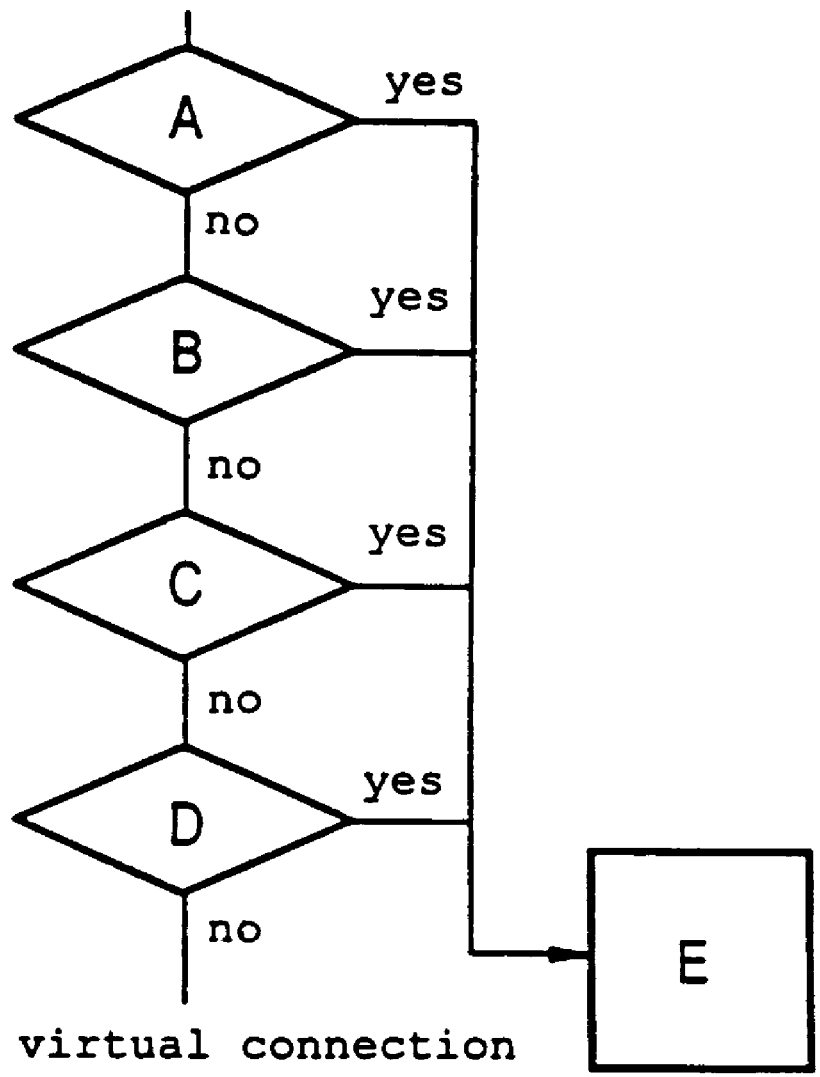
FIG. 3 shows a flowchart in accordance with the method according to the invention.

By way of example, FIG. 1 shows the basic idea of the method according to the invention, in tabular form. In this case, the basic principle is first of all explained for only one transmission rate.

Class S is accordingly split into a plurality of sub-classes $S_1$, $S_2$ and $S_3$. By way of example, only 3 sub-classes are disclosed, although, according to the present invention, subdivision may also be carried out into a multiplicity of sub-classes. When an new call request arrives, the sigma rule algorithm must therefore check conditions (a) and (b) in the present exemplary embodiment to determine the sub-class to which the new connection must be assigned. If condition (a) is not satisfied, then, in the present exemplary embodiment, the connection must be assigned to the appropriate sub-classes, and condition (b) needs to be checked at most 3 times. The best sub-class $S_x$ is then selected automatically.

A sub-class $S_x$ is in this case defined by a lower limit and/or upper limit of the peak cell rate PCR as well as the ratio of the transmission parameters SCR/PCR. The table in FIG. 1 shows 3 sub-classes as well as the associated q(c) values. For reasons of clarity, the limits associated with a sub-class are not shown in peak cell rates PCR, but in peak bit rates PBR.

Furthermore, in the function $q(c)=q_1+q_2/c$ the values $q_2$ and c are expressed as cell rates. For example the function $q(c)=8.0+40$ Mbit/s/c; Mbit/s becomes q(c)=8.0+94339/c [cells/s].

In this case, the conversion from Mbit/s to cells/s is carried out as follows:

$q_2$(cells/s)=$q_2$(bit/s)/53/8 and $c$(cells/s)=$c$(bit/s)/53/8.

For illustration, let us assume, by way of example, that a plurality of virtual connections VC are intended to be multiplexed onto one connecting line. This connecting line is assumed to have, on the one hand, peak bit rates of PBR=1 Mbit/s and an SCR/PCR ratio of 0.5 and, on the other hand, peak bit rates of PBR=2 Mbit/s and an SCR/PCR ratio of 0.1. The free transmission capacity on the connecting line is assumed to be c=100 Mbit/s.

In the situation where Class S is not subdivided any further and has the characteristics of sub-class $S_1$, the sigma rule algorithm from the prior art would allocate the virtual connections for which a call request exists to this sub-class. 74 virtual connections VC with PBR=1 Mbit/s are thus statistically multiplexed to form 50 virtual connections VC with peak bit rates PBR=2 Mbit/s.

In the situation where Class S is not subdivided any further and has the characteristics of sub-Class $S_3$, the sigma rule algorithm from the prior art would assign the virtual connections for which a call request exists to this sub-class. 69 virtual connections VC with PBR=1 Mbit/s are thus statistically multiplexed to form 50 virtual connections VC with peak bit rates PBR=2 Mbit/s.

The best results are achieved by assigning the virtual connections VC to sub-class $S_2$. In this case, 89 virtual connections VC with PBR=1 Mbit/s are statistically multiplexed to form 50 virtual connections VC with peak bit rates PBR=2 Mbit/s.

If Class S is now split, according to the invention, into sub-classes $S_1$, $S_2$, $S_3$, the sigma rule algorithm modified in this way will automatically select Class $S_2$. If, for example, a 70-th connection arises, the virtual connection will be rejected, according to what has been said above, if applied to sub-class $S_3$. This virtual connection will be accepted if applied to sub-classes $S_1$ and $S_2$. If a virtual connection is accepted, then no further classification into a further sub-class is carried out. In this case, the process of setting up the connection can be started.

The advantage of this procedure over the prior art is that the best class is automatically selected by virtue of the split into a plurality of sub-classes. The number of accepted virtual connections VC can then in many cases be increased by 10% or more in comparison with the algorithm from the prior art, which had only one Class S.

In the present example, it has been assumed that only one transmission rate was provided on the connecting line. However, in practice, a plurality of transmission rates are provided. A statistical multiplexing improvement can be achieved only for those connections whose peak cell rate PCR is less than 3% of the maximum possible transmission capacity C of the connecting line. It follows from this that, if various transmission rates are used on the connecting line, different sets of predetermined sub-classes $S_x$ are also worthwhile. However, for software reasons, the number of sub-classes which can be defined in advance is limited. A maximum of four sub-classes as well as the q(c) associated with them can thus be reserved, in tabular form, for each transmission rate on a connecting line.

FIG. 2 shows how the sub-classes are defined for different transmission rates on a connecting line. In this case, it is assumed that the transmission rates on the connecting line are assigned to different interface types, on the basis of International Standards.

Interface type 1 corresponds to 34.368 Mbit/s (80000 ATM cells per second)

Interface type 2 corresponds to 44.736 Mbit/s (96000 ATM cells per second)

Interface type 3 corresponds to 155.520 Mbit/s (353207 ATM cells per second)

FIG. 3 shows a flow chart, using which the call request originating from a transmitting device is accepted or rejected.

A first step A is used to check whether the virtual connection $VC_n$ to be set up as new can be accepted with the already existing virtual connections $VC_{n-1}$ if Class $S_1$ is chosen.

If this is the case, this virtual connection $VC_n$ is accepted, and the system-internal variables are updated for all four predefined Classes $S_x$ (x=1 . . . 4) (step E).

If not, a check is carried out in a second step B to determine whether the virtual connection $VC_n$ which is to be set up as new can be accepted with the already existing virtual connections $VC_{n-1}$ if Class $S_2$ is selected. If this is the case, the virtual connection $VC_n$ is accepted, and the corresponding system-internal variables are updated (step E).

If not, a third step C is used to check whether the virtual connection $VC_n$ to be set up as new can be accepted if Class $S_3$ is selected. If this is the case, the connection is accepted and the system-internal variables are updated (step E).

If not, a further step D is therefore used to check this connection to determine whether it can be accepted in Class $S_4$. If this is the case, the connection is accepted and the system-internal variables are updated, if not, the virtual connection $VC_n$ is completely refused (step E).

The essential feature in this case is, however, that the system-internal variables for all the connections are stored in updated form at all times in the network node. This is done by dynamically updating a table whenever an ATM link is set up and/or cleared. This table contains the parameters PCR, SCR for each ATM link. When an ATM link is set up, the new SCR and/or PCR value is added to the appropriate current values, and when a link is cleared, these values are subtracted in a corresponding manner. This ensures that the current PCR and SCR values are present in the network node at all times. The calculations for conditions (a) and (b) are then carried out using these current values.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for statistical multiplexing of ATM links, comprising:
    providing a plurality of virtual connections which transmit ATM cells via a connecting line; and
    assigning an incoming connection to a first or a second class depending on a result of a predetermined analysis, wherein the first class is subdivided into sub-classes, wherein the analysis is performed, in sequence, on each of the sub-classes until the incoming connection is assigned to a sub-class or all the sub-classes have been analyzed.

2. The method as claimed in claim 1, wherein at least one transmission parameter of the connecting line or the connection are used to determine the result of the analysis.

3. The method as claimed in claim 1, wherein at least one transmission parameter and analysis results are stored in a network node and are updated when an ATM link is set up and/or cleared.

* * * * *